(12) United States Patent
Thrien et al.

(10) Patent No.: US 10,832,876 B2
(45) Date of Patent: Nov. 10, 2020

(54) PUSH-BUTTON SWITCH WITH THE SWITCHING ELMENT ARRANGED ON THE KEYCAP

(71) Applicant: VOLKSWAGEN AKTIENGESELLSCHAFT, Wolfsburg (DE)

(72) Inventors: Markus Thrien, Gladbeck (DE); Niels Petter, Essen (DE); Alexander Oong, Düsseldorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/197,690

(22) Filed: Nov. 21, 2018

(65) Prior Publication Data
US 2019/0157023 A1 May 23, 2019

(30) Foreign Application Priority Data
Nov. 21, 2017 (DE) .................. 10 2017 220 780

(51) Int. Cl.
*H01H 13/14* (2006.01)
*H01H 3/12* (2006.01)
(Continued)

(52) U.S. Cl.
CPC ............ *H01H 13/14* (2013.01); *H01H 3/125* (2013.01); *H01H 13/023* (2013.01);
(Continued)

(58) Field of Classification Search
CPC ...... H01H 13/14; H01H 13/705; H01H 3/125; H01H 3/04; H01H 2237/00; H01H 23/16; G06F 3/041; G06F 3/016; G06F 3/0202
See application file for complete search history.

(56) References Cited

U.S. PATENT DOCUMENTS 4,103,126 A * 7/1978 DeNigris ................. H01H 5/14
200/339
4,978,824 A * 12/1990 Allen .................... H01H 13/285
200/447
(Continued)

FOREIGN PATENT DOCUMENTS

CN 2800464 Y 7/2006
DE 29918540 U1 2/2000
(Continued)

OTHER PUBLICATIONS

Search Report for European Patent No. 18201351; dated Feb. 27, 2019.
(Continued)

*Primary Examiner* — Vanessa Girardi
(74) *Attorney, Agent, or Firm* — Barnes & Thornburg LLP

(57) ABSTRACT

A push-button switch and a transportation vehicle in which the disclosed push-button switch is inserted. The push-button switch has a keycap, a base plate, a switching element, a first lever and a second lever. The first lever and the second lever are each mounted for rotation on the base plate by a pivot bearing and are each movably connected to the keycap at a first lever end. The first lever and the second lever are movably connected to one another at a second lever end. The switching element is arranged on the keycap so the switching element is actuated by the second lever end of the first lever or by the second lever end of the second lever.

19 Claims, 5 Drawing Sheets

(51) Int. Cl.
*H01H 13/02* (2006.01)
*H01H 13/10* (2006.01)
*H01H 13/52* (2006.01)

(52) U.S. Cl.
CPC ............. *H01H 13/10* (2013.01); *H01H 13/52* (2013.01); *H01H 2219/046* (2013.01); *H01H 2219/048* (2013.01)

(56) References Cited

U.S. PATENT DOCUMENTS

| | | | |
|---|---|---|---|
| 5,828,015 A | 10/1998 | Coulon | |
| 6,060,676 A | 5/2000 | Pan | |
| 8,253,698 B2* | 8/2012 | Chen | G06F 3/016 345/173 |
| 8,829,378 B2* | 9/2014 | Villain | G06F 3/03547 200/5 R |
| 9,508,505 B2 | 11/2016 | Hsu | |
| 9,997,308 B2* | 6/2018 | Leong | H01H 13/88 |
| 2008/0185279 A1 | 8/2008 | Lin | |
| 2010/0172080 A1* | 7/2010 | Bestle | G06F 3/016 361/679.21 |
| 2012/0038562 A1 | 2/2012 | Holman, IV et al. | |
| 2016/0336127 A1 | 11/2016 | Leong et al. | |

FOREIGN PATENT DOCUMENTS

| | | |
|---|---|---|
| DE | 102005049848 A1 | 4/2007 |
| DE | 102007040604 A1 | 12/2008 |
| DE | 102009013440 A1 | 9/2009 |
| DE | 102008035907 A1 | 2/2010 |
| DE | 102013003464 A1 | 9/2014 |
| DE | 112013005212 T5 | 8/2015 |
| DE | 102016101556 B3 | 7/2017 |
| WO | 2011000910 A1 | 1/2011 |
| WO | 2016183498 A1 | 11/2016 |

OTHER PUBLICATIONS

Search Report for German Patent Application No. 10 2017 220 780.9; dated Aug. 25, 2018.
Third-Party Observations for European Patent Application No. 18201351; Dec. 6, 2019.

\* cited by examiner

PUSH-BUTTON SWITCH WITH THE SWITCHING ELEMENT ARRANGED ON THE KEYCAP

PRIORITY CLAIM

This patent application claims priority to German Patent Application No. 10 2017 220 780.9, filed 21 Nov. 2017, the disclosure of which is incorporated herein by reference in its entirety.

SUMMARY

Illustrative embodiments relate to a push-button switch, in particular, a push-button switch with a haptic feedback which is suitable for large surface designs. Illustrative embodiments further relate to a transportation vehicle in which the disclosed push-button switch is installed.

BRIEF DESCRIPTION OF THE DRAWINGS

Disclosed embodiments will be described in more detail with reference to the figures, in which.

DETAILED DESCRIPTION

Figure 1:
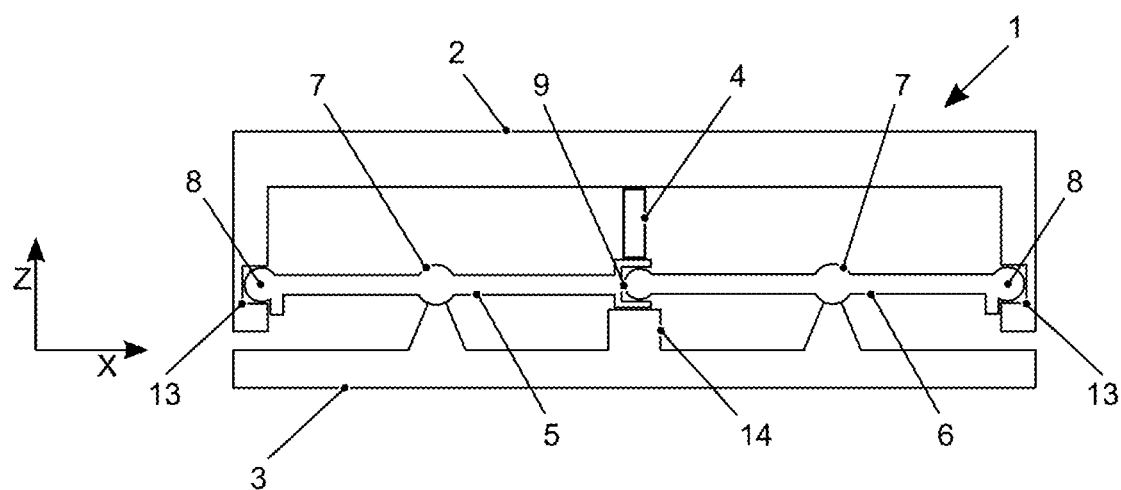
FIG. 1 shows a simplified schematic illustration of a side view of a push-button switch in a rest position.

Within the scope of a modern internal configuration of transportation vehicles there is increasingly the need for installing comparatively large and where applicable heavy elements in the most varied of positions in the transportation vehicle where they are to serve at the same time as push-button switches. Push-button switches can be provided by way of example, as touchscreens, displays or buttons in the center console, the steering wheel, the doors, roof or the dashboard where the transportation vehicle occupants can trigger a desired function through finger pressure. It is then desirable that the operating forces required remain substantially the same irrespective of the position of the pressure point on the surface of the push-button switch. For reasons of costs it is moreover desirable if the push-button switches are provided with only one sensor or element for the haptic feedback.

DE 10 2007 040 604 A1 describes a switching device for switching a consumer on and off, in particular, a motor in a transportation vehicle. The switching device comprises a housing, an actuating element, a switching element and a display. The actuating element is mounted on the display. The switching element can be activated by the actuating element, wherein at least one switching signal for a control unit is generated by the switching element. The switching element is a piezo switch which is arranged in such a way that this generates the switching signal when the actuating element slides into the housing. Since the actuating element can cant relatively easily in the housing, the solution described can be applied only for smaller push-button switches.

US 2012/0038562 A1 describes an electronic apparatus which comprises a housing, a touch-sensitive display on a front side of the housing, and an actuator. The actuator is mounted between the front side and back of the housing and is configured so that the touch-sensitive display can be moved together with the front side relative to the back of the housing when actuated. The actuator comprises several piezoelectric disks. The mechanism described is inclined to tilt and moreover requires several sensors. The mechanism is moreover relatively imprecise so that large gaps appear towards the adjoining housing.

DE 299 18 540 U1 describes a push-button switch for a computer keyboard. The push-button switch comprises a button, a rubber cone, a first lever, a second lever and a base body. The first lever and the second lever are connected to one another via an articulated hinge mechanism and can be moved relative to one another in the manner of scissors. A recessed receiving chamber is formed in the base body and is provided underneath the first lever and the second lever. If the two levers are moved downwards in an articulated manner by the button they can drop into the receiving chamber.

DE 11 2013 005 212 T5 describes a push-button mechanism for a computer keyboard. Each button comprises a keycap module, a supporting structure and a butterfly hinge. The butterfly hinge comprises two separate wings which are positioned adjacent one another so that a cavity is formed between the two wings. Each wing comprises a pair of hinge pins and a pair of keycap module pins. The hinge pins are coupled here to the supporting structure and the keycap module pins are coupled to the keycap module.

The solutions used for computer keyboards cannot support large loads such as by way of example 5-inch displays. Larger surfaces tend to tilt so that in the case of buttons such as the space key, the shift key or the enter key, a displacement of the buttons perpendicular to the actuating direction is often visible and in part several switching elements are required so that they trigger securely.

Disclosed embodiments provide an alternative construction of a push-button switch which is suitable for large-surface designs.

According to a first disclosed embodiment, a push-button switch comprises a keycap, a base plate, a switching element, a first lever and a second lever, wherein the first lever and the second lever are each mounted on the base plate for rotation by a pivot bearing, are each movably connected at a first lever end to the keycap and connected movably to one another at a second lever end, and wherein the switching element is arranged on the keycap in such a way that it can be actuated by the second lever end of the first lever or by the second lever end of the second lever.

The present construction allows large push-button switches, which can support, for example, a display, to have a very flat design. The push-button switches are very simple and cost-effective to construct since the two levers can have the same structure, and are at the same time sturdy against overloading. As a result of the lever mechanism only one central switching element is required to make a large surface into a push-button switch. The haptic perception during actuation, i.e., with finger pressure on the keycap, corresponds to that of a standard push-button structure, which would however require a long guide in the actuating direction in view of the size of the push-button.

According to at least one disclosed embodiment, the first lever and the second lever are mounted without play on the base plate. Through the play-free mounting of the levers on the base plate the keycap is in a very good position relative to the base plate when in its rest position. At the same time the construction substantially prevents the keycap from turning about the actuating direction.

According to at least one disclosed embodiment, the pivot bearings each have a support layer and at least one hold-down clamp. Thus, in this way no movable elements are required for the pivot bearings so that a very simple low-wear structure is obtained.

According to at least one disclosed embodiment, at least one hold-down clamp is a separate component which is connected to the base plate. This simplifies the assembly of the push-button switch. First the levers can be mounted relative to the base plate and then the keycap is fastened. Finally the separate hold-down clamp is inserted to stabilize the construction.

According to at least one disclosed embodiment, the first lever end of the first lever, and the first lever end of the second lever in the actuating direction of the push-button switch are connected free of play to the keycap, or the second lever end of the first lever and the second lever end of the second lever in the actuating direction of the push-button switch are connected to one another free of play. Through the at least substantially play-free connection the keycap is moved with a practically parallel displacement in the direction of the base plate. Thus, it is immaterial where finger pressure is applied to the keycap.

According to at least one disclosed embodiment, the first lever end of the first lever and the first lever end of the second lever engage in corresponding grooves in the keycap. In this way a simple cost-effective solution is achieved for a play-free force-fitting connection between the keycap and the levers. No complicated mechanical articulated joints are required.

According to at least one disclosed embodiment, the second lever end of the first lever and the second lever end of the second lever are meshed with one another. In this way a simple cost-effective solution is achieved for a play-free force-fitting connection between the levers which happens without any additional movable or deformable parts. During assembly the teeth of the lever ends need only be fitted into one another so that a simple assembly is ensured.

According to at least one disclosed embodiment, the first lever and the second lever are mounted in a central or off-center position on the base plate. The travel of the keycap can be determined by the choice of position of the bearing of the levers. Thus, the push-button switch can be adapted in its construction to different uses.

According to at least one disclosed embodiment, the base plate has a stop for the first lever or the second lever which determines a rest position. A defined vertical position of the keycap in the rest position is achieved by the stop, which is beneficial for a surface-flush installation of the push-button switch.

According to at least one disclosed embodiment, the switching element has at least one of the following elements: a dome switch, a piezo element, an electromagnet or a vibration element. The disclosed solution requires only a central switching element for the haptic feedback. To detect a force, this can be by way of example a dome switch as known for computer keyboards. For a force feedback a travel of the entire keycap counter to the actuating direction can be produced by a piezo element or an electromagnet. For a haptic feedback that is a vibration, the central switching element can be a vibration element.

According to a disclosed embodiment, a display is arranged on the keycap. The display can be used to indicate variable contents on the push-button switch and thus adapt the push-button switch to different operating situations. The possibility is also provided of providing large displays with a haptic feedback.

It is beneficial if a disclosed push-button switch is used in a transportation vehicle, in particular, a motorized transportation vehicle. A push-button switch of this kind is suitable for practically all operating elements, by way of example in the roof region, in the doors, as steering wheel buttons, for navigation or multi-media systems, operating climate control, etc. Their use is, however, not restricted to the transportation vehicle region, but basically the disclosed push-button switch can be used everywhere where thin buttons, displays or touchscreens are required and where at the same time a haptic feedback is desired.

For a better understanding of the principles of the disclosure, the disclosed embodiments will now be explained in detail with reference to the figures. It is evident that the disclosure is not restricted to these embodiments and that the features described can also be combined or modified without departing from the scope of protection of the disclosure.

FIG. 1 shows a simplified schematic illustration of a side view of a push-button switch 1 in a rest position. This is a sectional view along the X-Z plane wherein Z is the actuating direction of the push-button switch 1. The push-button switch 1 comprises a keycap 2, a base plate 3, a switching element 4, a first lever 5 and a second lever 6. In this example the switching element 4 is a dome switch. The keycap 2 is movable whilst the base plate 3 is fixed at the installation point of the push-button switch 1. The first lever 5 and the second lever 6 are each mounted for rotation in the Y-direction on the base plate 3 by a pivot bearing 7. The two levers 5, 6 may be fixed in position in the Z- and X directions. The movable keycap 2 is movably connected on two opposite sides to each first lever end 8 of the two levers 5, 6, by way of example by the lever ends 8 engaging in corresponding grooves 13 in the keycap 2. The grooves 13 are then configured here so that there is hardly any play in the Z-direction and the lever ends 8 can slide in the X-direction out from the groove 13 when these lever ends 8 move in the direction of the base plate 3. The first lever 5 and the second lever 6 are movably connected to one another at a second lever end 9 so that a movement is transferred from one lever 5, 6 to the other at least in a certain angular range of about ±6□. This connection may be free of play in the Z-direction. The switching element 4 is arranged on the keycap 2 in such a way that it can be actuated by the second lever end 9 of the first lever 5 or by the second lever end 9 of the second lever 6. The spring force of the switching element 4 which can be by way of example in the order of 6N holds the system at rest. The two levers 5, 6 are then pressed against a stop 14. On the other side the switching element 4 is supported against the keycap 2 which is held in position by the other lever ends 8. Depending on the selected play of the levers 5, 6 and the keycap 2 relative to one another the keycap 2 is positioned very well in its rest position in the X- and Y-direction through the lever mechanism. At the same time the construction substantially prevents the keycap 2 from turning about the Z-axis.

Figure 2:
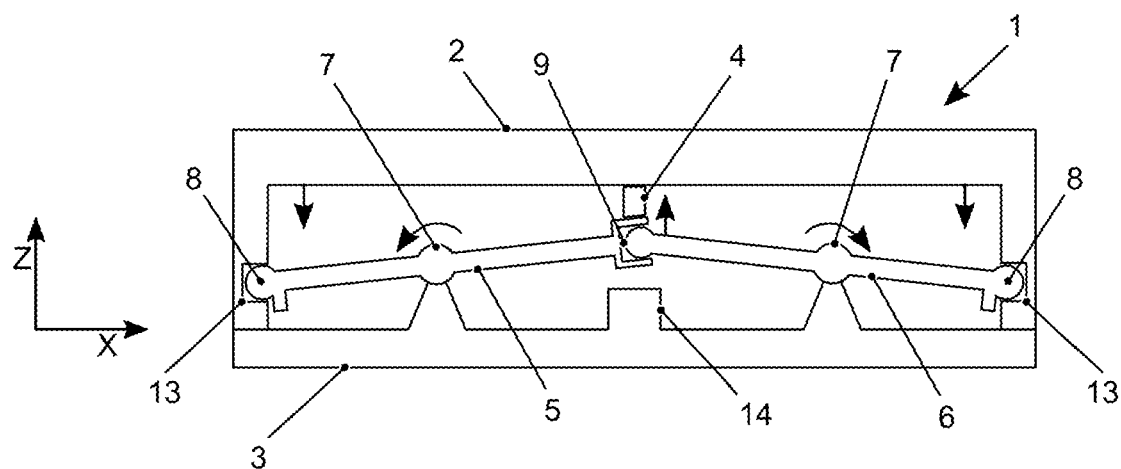
FIG. 2 shows the push-button switch of FIG. 1 in an operating position.

FIG. 2 shows the push-button switch of FIG. 1 in an actuating position. With a rising actuating force from the user the switching element 4 is compressed through the upward movement of the lever ends 9 of the two levers 5, 6 which are movably connected to one another. At the same time the keycap 2 is moved parallel to the base plate 3 and presses on the switching element from the other side. The switching element 4 collapses finally when its trigger force is reached, by way of example 6N. As a result of the connections of the levers 5, 6 to one another substantially without play in the Z-direction and to the keycap 2 and the pivot bearings 7 the keycap 2 moves with a practically parallel displacement in the Z-direction relative to the base plate 3 irrespective of the position in X and Y where finger pressure is applied to the keycap 2. The movements of the different elements are indicated by the arrows as shown.

Disclosed embodiments will now be described below with reference to FIGS. 3 to 10.

Figure 3:
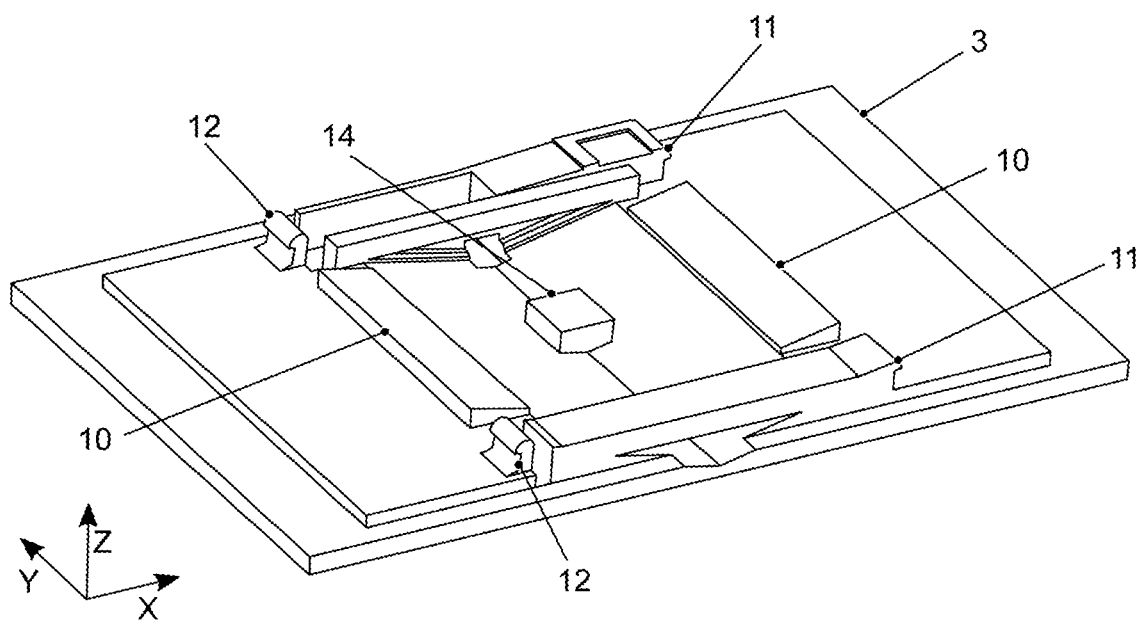
FIG. 3 shows a base plate of a disclosed embodiment of the push-button switch.

FIG. 3 shows a base plate 3 of a disclosed embodiment of the push-button switch. The coordinate system used is also shown. In this disclosed embodiment the pivot bearings for the levers are each formed by a support layer 10 and two hold-down clamps 11, 12. For each pivot bearing the first hold-down clamp 11 is formed here fixed on the base plate 3, whilst the second hold-down clamp 12 is a separate component which is snap-fitted, clamped or stuck onto the base plate. In this way the subsequent assembly of the levers can be simplified. A stop 14 is located on the base plate 3 approximately midway between the support layers 10, with the levers coming to lie in their rest position on the stop 14.

Figure 4:
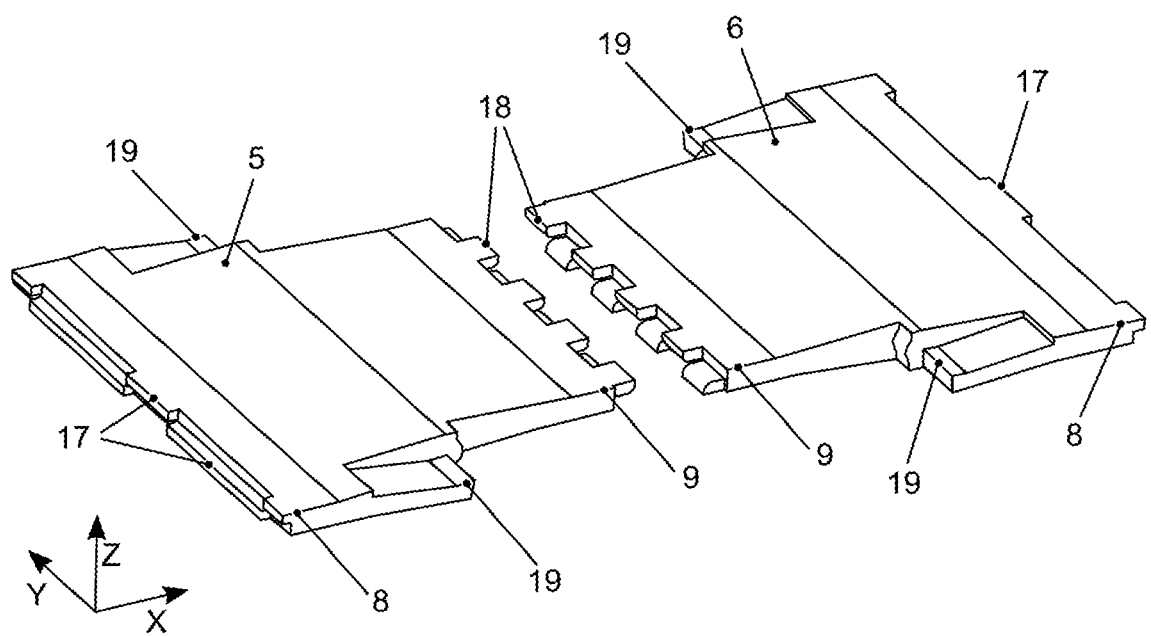
FIG. 4 shows a pair of levers of the disclosed embodiment of the push-button switch.

FIG. 4 shows a pair of levers of the disclosed embodiment of the push-button switch. In this disclosed embodiment the first lever 5 and the second lever 6 are structurally identical whereby manufacturing costs can be saved. The levers 5, 6 have on a first lever end 8 projections 17 which in the assembled state of the push-button switch interact with corresponding grooves of the keycap and thus produce the movable connection with the keycap. The levers 5, 6 have at a second lever end 9 a toothed structure 18 by which the movable play-free connection is produced between the levers 5, 6. On the two sides of each lever 5, 6 there are contact faces 19. These serve to position the levers 5, 6 firmly on the base plate by the hold-down clamps.

Figure 5:
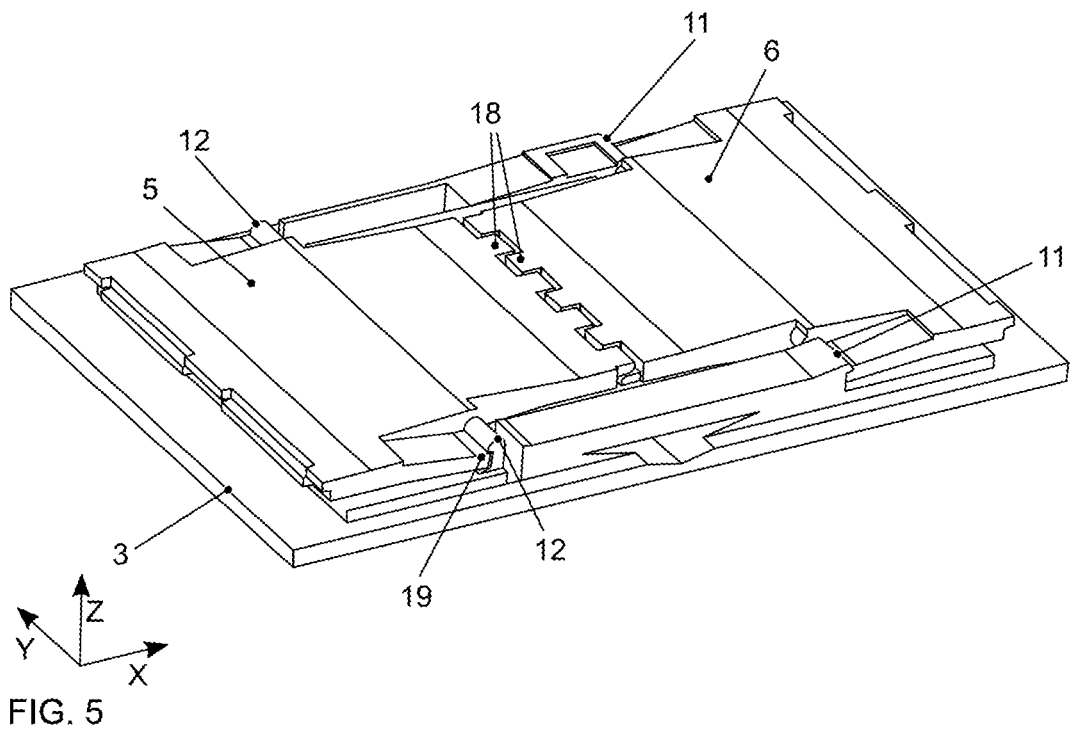
FIG. 5 shows the base plate of FIG. 3 with the mounted pair of levers of FIG. 4.

FIG. 5 shows the base plate 3 of FIG. 3 with the mounted pair of levers of FIG. 4. The levers 5, 6 rest on the support layers of the pivot bearings and are held against the contact faces 19 by the hold-down clamps 11, 12. The teeth 18 of the two levers 5, 6 moreover engage in one another so that a force-fitting movable connection exists between the levers 5, 6.

Figure 6:
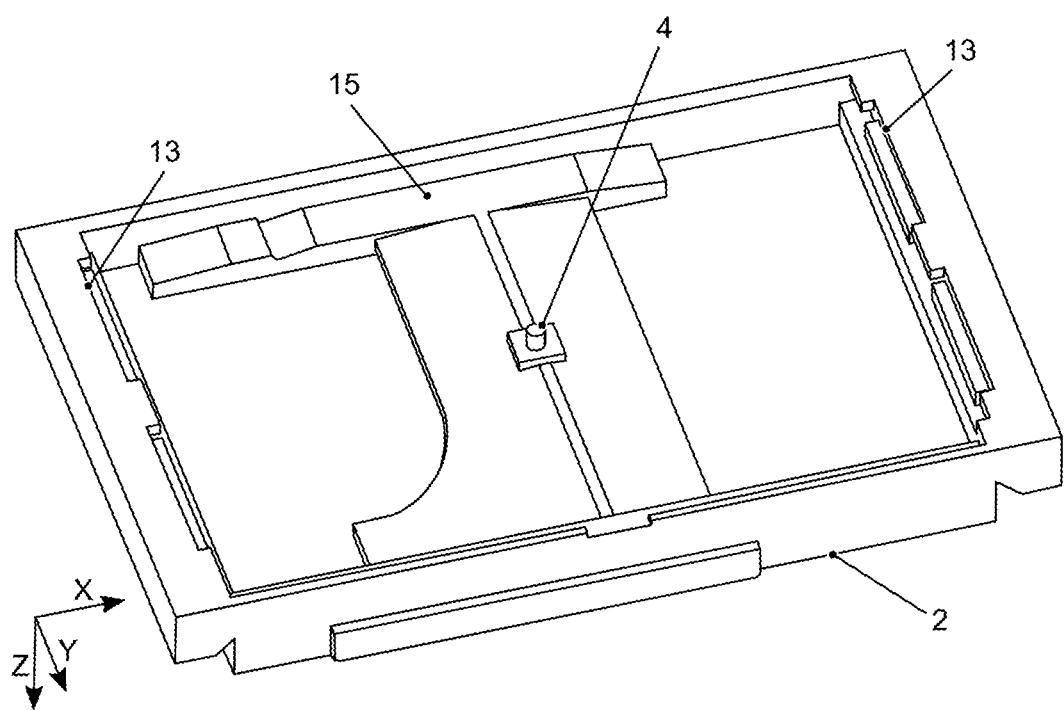
FIG. 6 shows a keycap of the disclosed embodiment of the push-button switch.

FIG. 6 shows a keycap 2 of the disclosed embodiment of the push-button switch. The keycap 2 is shown here in a view from below, i.e., the keycap 2 was turned 180□ about the X-axis. Grooves 13 are arranged on the short edges of the keycap 2 and interact with the projections at each first lever end of the levers to provide a movable connection with the levers. A positioning aid 15 for the switching element 4 is furthermore arranged inside the keycap 2 and makes it easier to position the switching element 4.

Figure 7:
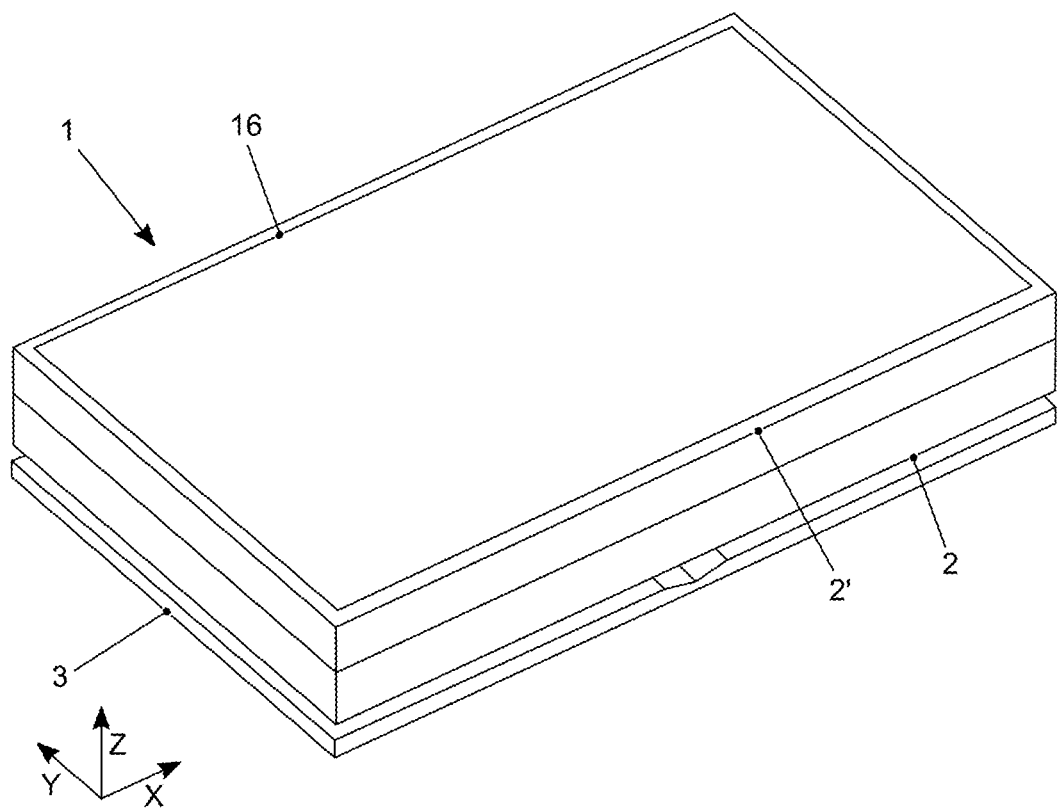
FIG. 7 shows an example of the fully assembled push-button switch.

FIG. 7 shows an example of the fully assembled push-button switch 1. In this example in addition to the key cap 2 there is a keycap attachment 2', i.e., the keycap 2 is comprised of two parts. A display 16 is inserted in the keycap attachment 2' whereby variable contents can be displayed on the push-button switch 1. In the assembled state the push-button switch 1 has a width of 125 mm in the X-direction, a depth of 76 mm in the Y-direction and a height of 22 mm in the Z-direction. The height in the Z-direction for the lever mechanism thereby uses about 7 mm with a travel of the keycap of □0.6 mm.

Figure 8:
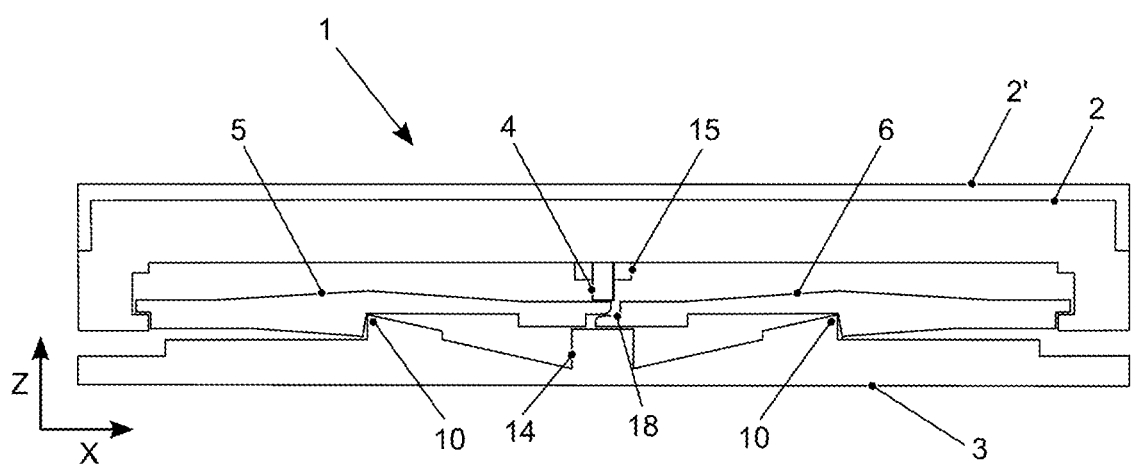
FIG. 8 shows a first section through the push-button switch of FIG. 7 along the X-Z plane.

FIG. 8 shows a first section through the push-button switch 1 of FIG. 7 along the X-Z plane. In the illustrated diagram the section runs centrally through the stop 14. The combination of keycap 2 and keycap attachment 2' can be clearly seen. It is also clear to see how the support layers 10 of the base plate 3 each define an axis of rotation for the first lever 5 and the second lever 6. The teeth 18 of the two levers 5, 6 engage in one another and thus form a movable force-fitting connection between the levers 5, 6. In the illustrated rest position the lever ends rest on the stop against which they are pressed by the switching element 4. The exact positioning of the switching element 4 through the positioning aid 15 can likewise be seen.

Figure 9:
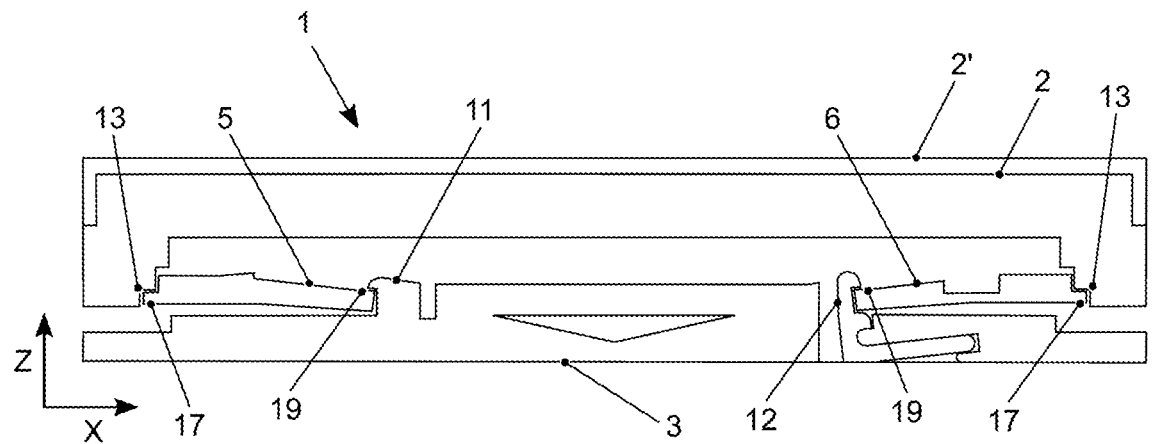
FIG. 9 shows a second section through the push-button switch of FIG. 7 along the X-Z plane.

FIG. 9 shows a second section through the push-button switch 1 of FIG. 7 along the X-Z plane. In the illustrated drawing the section runs approximately centrally through the hold-down clamps 11, 12. It is clear to see how the hold-down clamps 11, 12 interact with the contact faces 19 to position the levers 5, 6 in fixed manner on the base plate 3. It is furthermore apparent that the second hold-down clamp 12 is configured as a separate component which is snap-fitted, clamped or stuck onto the base plate 3. The required movable connection between the levers 5, 6 and the keycap 2 is achieved through the interaction of the projections 17 with the corresponding grooves 13 of the keycap 2.

Figure 10:
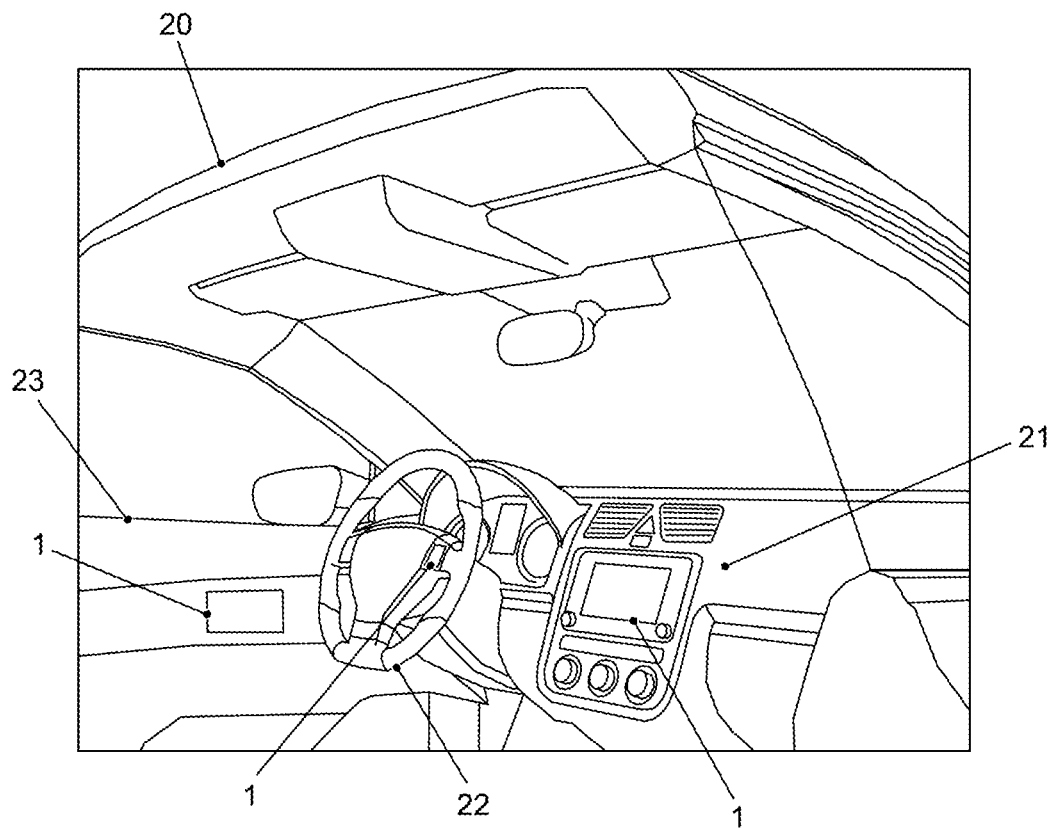
FIG. 10 shows schematically an inside area of a transportation vehicle in which disclosed push-button switches are installed.

FIG. 10 shows diagrammatically an interior space of a transportation vehicle 20 in which push-button switches 1 are installed. A first push-button switch 1 with display is arranged in a dashboard 21 of the transportation vehicle 20, by way of example for operating an infotainment system. A further considerably smaller push-button switch 1 is installed in the steering wheel 22. By this it is possible by way of example to operate hands-free equipment or operate a cruise control. A third push-button switch 1 is mounted in the door 23 of the driver's side. With this push-button switch 1 it is possible, for example, to open the door 23, wherein where applicable a notice can appear on a display of the push-button switch 1 when neighboring traffic creates a danger situation.

REFERENCE NUMERAL LIST

1 Push-button switch
2 Keycap
2' Keycap attachment
3 Base plate
4 Switching element
5 First lever
6 Second lever
7 Pivot bearing
8 First lever end
9 Second lever end
10 Support layer
11 First hold-down clamp
12 Second hold down clamp
13 Groove
14 Stop
15 Positioning aid
16 Display
17 Projection
18 Teeth
19 Contact face 20 Transportation vehicle
21 Dashboard
22 Steering wheel
23 Door

The invention claimed is:

1. A push-button switch comprising:
a keycap;
a base plate;
a switching element;
a first lever; and
a second lever,
wherein the first lever and the second lever are each mounted for rotational movement on the base plate by a pivot bearing and are each movably connected at a first lever end to the keycap and are connected movably to one another at a second lever end,
wherein the switching element is arranged on the keycap so the switching element is actuated by the second lever end of the first lever or by the second lever end of the second lever, and
wherein the base plate has a stop located at a juncture where the first lever and the second lever connect, wherein the stop determines a rest position.

2. The push-button switch of claim 1, wherein the first lever and the second lever are mounted free of play on the base plate.

3. The push-button switch of claim 1, wherein the first lever end of the first lever and the first lever end of the second lever are connected free of play to the keycap in the actuating direction of the push-button switch, or the second lever end of the first lever and the second lever end of the second lever are connected to one another free of play in the actuating direction of the push-button switch.

4. The push-button switch of claim 1, wherein the first lever end of the first lever, and the first lever end of the second lever engage in corresponding grooves in the keycap.

5. The push-button switch of claim 1, wherein the second lever end of the first lever and the second lever end of the second lever are meshed with one another.

6. The push-button switch of claim 1, wherein the first lever and the second lever are mounted in a central or off-center position on the base plate.

7. The push-button switch of claim 1, wherein the switching element has at least one of the following elements: a dome switch, a piezo element, an electromagnet or a vibration element.

8. The push-button switch of claim 1, wherein a display is arranged on the keycap.

9. The push-button switch of claim 1, wherein the pivot bearings each have a support layer and at least one hold-down clamp.

10. The push-button switch of claim 9, wherein at least one hold-down clamp is a separate component connected to the base plate.

11. A transportation vehicle comprising:
a push-button switch with a keycap, a base plate, a switching element, a first lever and a second lever,
wherein the first lever and the second lever are each mounted for rotational movement on the base plate by a pivot bearing and are each movably connected at a first lever end to the keycap and are connected movably to one another at a second lever end,
wherein the switching element is arranged on the keycap so the switching element is actuated by the second lever end of the first lever or by the second lever end of the second lever, and
wherein the base plate has a stop located at a juncture where the first lever and the second lever connect, wherein the stop determines a rest position.

12. The transportation vehicle of claim 11, wherein the first lever and the second lever are mounted free of play on the base plate.

13. The transportation vehicle of claim 11, wherein the first lever end of the first lever, and the first lever end of the second lever engage in corresponding grooves in the keycap.

14. The transportation vehicle of claim 11, wherein the second lever end of the first lever and the second lever end of the second lever are meshed with one another.

15. The transportation vehicle of claim 11, wherein the first lever and the second lever are mounted in a central or off-center position on the base plate.

16. The transportation vehicle of claim 11, wherein the switching element has at least one of the following elements: a dome switch, a piezo element, an electromagnet or a vibration element.

17. The transportation vehicle of claim 11, wherein a display is arranged on the keycap.

18. The transportation vehicle of claim 11, wherein the pivot bearings each have a support layer and at least one hold-down clamp.

19. The transportation vehicle of claim 18, wherein at least one hold-down clamp is a separate component connected to the base plate.

* * * * *